United States Patent [19]

Greenberg

[11] Patent Number: 5,362,459

[45] Date of Patent: Nov. 8, 1994

[54] NEODYMIUM RECOVERY PROCESS

[75] Inventor: Bernard Greenberg, Brooklyn, N.Y.

[73] Assignee: Pure-Etch Co., Woodland Hills, Calif.

[21] Appl. No.: 61,461

[22] Filed: May 17, 1993

[51] Int. Cl.$^5$ .............................................. C01F 17/00
[52] U.S. Cl. .................................. 423/21.1; 423/263
[58] Field of Search .............................. 423/21.1, 263

[56] References Cited

U.S. PATENT DOCUMENTS

| | | | |
|---|---|---|---|
| 2,783,125 | 2/1957 | De Rohden et al. | 423/21.1 |
| 3,619,128 | 11/1971 | Angstadt | 423/21.1 |
| 3,763,050 | 10/1973 | Dikhoff et al. | 423/21.1 |
| 4,906,290 | 3/1990 | Worner | 75/10.13 |

FOREIGN PATENT DOCUMENTS

| | | | |
|---|---|---|---|
| 216688 | 4/1987 | European Pat. Off. | 423/263 |
| 61-127621 | 6/1986 | Japan | 423/21.1 |
| 62-132731 | 6/1987 | Japan | 423/263 |
| 62-187112 | 8/1987 | Japan | 423/21.1 |
| 1-021022 | 1/1989 | Japan | 423/21.1 |

OTHER PUBLICATIONS

Morrison, J. W. et al., "Recovery of Metal Values from NdFeB Magnet Scrap," Bureau of Mines, pp. 1–17, no date.

Primary Examiner—Gary P. Straub
Assistant Examiner—Steven Bos
Attorney, Agent, or Firm—Thomas I. Rozsa; Tony D. Chen

[57] ABSTRACT

The present invention is a method of recovering neodymium (Nd) from waste by-products of rare earth magnet manufacture. Two main waste by-products, NdFeB swarf and NdFeB slag, are treated by two respective chemical schemes as described above. However, the only major consumption of chemical compound in both schemes is hydrofluoric acid (HF). The present invention scheme for NdFeB swarf recovery is characterized by using acetic acid ($HC_2H_3O_2$) having a pK value of approximately 4.7. The present invention scheme for NdFeB slag recovery is characterized by using sulfamic acid electrolyte bath having a pH value of approximately 2.7. The moist neodymium trifluoride ($NdF_3$) produced by both schemes can be dried by using the same microwave radiation technique to produce dry neodymium trifluoride ($NdF_3$) which contains less than 3% moisture.

9 Claims, 4 Drawing Sheets

NEODYMIUM RECOVERY PROCESS

BACKGROUND OF THE INVENTION

1. Field of The Invention

The present invention generally relates to the field of the recovery of valuable material from industrial waste. More particularly, the present invention relates to the field of the recovery of neodymium (Nd) from industrial by-products of rare earth magnet manufacture.

2. Description of The Prior Art

There are two waste materials which are by-products of the rare earth magnet manufacture. Both waste materials contain iron (Fe) and rare earth metal neodymium (Nd), in the form of $Nd_2Fe_{14}B$, where B is boron. The first is a powdery grinding swarf (hereafter "NdFeB swarf"). The second is a nodular metallic slag (hereafter "NdFeB slag"). The two waste materials require two considerably different approaches to chemical schemes for recovering the neodymium (Nd) values contained therein. However, the objective behind both approaches are the same: to obtain maximum product purity, while totally avoiding the generation of problematic new waste materials, and maintaining work place and environmental safety as well as cost effectiveness.

In the prior art, the process of recovery of neodymium (Nd) from the by-products of rare earth magnet production are not satisfactorily developed and implemented on an industrial scale. There are two major problems in the development of a feasible process for the recovery of neodymium (Nd) from either the NdFeB swarf or the NdFeB slag. The first problem is the high cost of chemical material incurred which the processing of the constituent iron demands. The second problem is the massive disposal of the considerable mass of the iron by-product in some chemical form or other.

The difficulty which persists in the prior art for neodymium (Nd) recovery is both theoretical and practical. As a practical difficulty, the iron is intimately dispersed within the magnet alloy and the entire waste mass must be solubilized to separate neodymium (Nd), and there is just no simple way to do that in the prior art. As a theoretical difficulty, it has been conventionally believed in prior art rare earth chemistry that the lanthanide metals would liberate hydrogen from water and be attacked by acids, but not by alkalis. This belief has effectively foreclosed any attempt in utilizing alkalization in a neodymium (Nd) recovery process. As a result, prior art neodymium recovery processes are almost exclusively based on acid dissolution at the initial stage of the recovery process.

J. W. Morrison and G. R. Palmer, chemical engineers in the Salt Lake City Research Center of the Bureau of Mines, United States Department of the Interior, wrote an article entitled "Recovery of Metal Values From NdFeB Magnet Scrap" (hereafter "the Morrison article").

The Morrison article mentioned several prior art methods of neodymium recovery, such as magnetic and leaching procedures, but discarded them because "the extremely fine grain size of the oxidized scrap prevented recovery by either technique" (page 1, Abstract). It disclosed a recovery process of using sulfuric acid ($H_2SO_4$) dissolution followed by precipitation of neodymium-sodium-sulfate double salts having formulas such as $Nd_2(SO_4)_3.Na_2SO_4.6H_2O$, $Nd_2(SO_4)_3.3Na_2SO_4.12 6H_2O$, or $NaNd(SO_4)_2.nH_2O$, where n is 0 or 1 (page 14, lines 11 through 13). The neodymium-sodium-sulfate double salts were then treated with hydrofluoric acid (HF) to produce neodymium trifluoride ($NdF_3$). The major problem with the prior art sulfuric acid based processes is that the neodymium-sulfate salts do not crystallize properly from aqueous solution, and cannot yield a pure product.

The final treatment of neodymium trifluoride ($NdF_3$) has also presented some problems in the prior art. The converted neodymium trifluoride ($NdF_3$) contains a significant amount of moisture and must be dried. In the prior art the drying step is normally carried out by heating the neodymium trifluoride ($NdF_3$) in the atmosphere of hydrogen fluoride (HF) gas. This presents considerable work place hazard, and an air-pollution control problem as well. Another prior art drying method is thermal-drying. However, the thermal-drying method tends to eliminate the hydrogen fluoride (HF) gas with the formation of neodymium oxyfluoride (NdFO), which is unacceptable as a feed material to the calciothermic metal winning method. An alternative prior art drying method is air-drying. Unfortunately, air-dried neodymium trifluoride ($NdF_3$) contains about at least 3% moisture, which is not quite acceptable since the calciothermic process in which it is used to make industrial neodymium metal is highly sensitive to moisture.

It is highly desirable to provide a simple and advanced recovery process for industrial scale operation, which process can produce an optimum neodymium (Nd) recovery rate, while conforming with very high environmental and work place safety standards, and maintaining very low production costs.

SUMMARY OF THE INVENTION

The present invention is a novel method of recovering neodymium (Nd) from waste by-products of rare earth magnet manufacture.

A general object of the present invention is to provide a new method for the recovery of neodymium (Nd) from the waste by-product of rare earth magnet manufacture.

Another object of the present invention neodymium (Nd) recovery process is to utilize a chemical scheme that requires minimal input of chemical compounds and produces no output of chemical waste.

A further object of the present invention neodymium (Nd) recovery process is to employ a chemical scheme that is hazardless both to the work place and to the environment.

The present invention neodymium (Nd) recovery method includes two different processes, each incorporating a new chemical scheme. The first recovery process is utilized for recovering neodymium (Nd) from NdFeB swarf, and the second recovery process is utilized for recovering neodymium (Nd) from NdFeB slag. The objectives of the two recovery process are same: to achieve high efficiency in neodymium (Nd) recovery, to conform with strict safety standards, and to maintain minimum production costs.

It is known that neodymium (Nd) may be recovered from the by-products of rare earth magnet manufacture. It is also known that the two major waste by-products from rare earth magnet manufacture are NdFeB swarf and NdFeB slag. However, prior art neodymium (Nd) recovery processes have been mainly limited to using acids, such as sulfuric acid ($H_2SO_4$) or hydrochloric acid (HCl), at the initial stage of treating such waste materials.

It has been discovered, according to the present invention, that contrary to the conventional wisdom in rare earth chemistry that the lanthanide metals will liberate hydrogen from water and are attacked by acids but not by alkalis, the lanthanide metals are in fact attacked by aqueous alkali superficially and are converted to oxides at the surface.

It has also been discovered, according to the present invention, that it is important to use a weak acid in the digestion process of the crude obtained from the initial alkali treatment stage, so that only neodymium oxide ($Nd_2O_3$) contained in the crude is dissolved but the ferric oxide ($Fe_2O_3$) remains largely undissolved, which effectively separates neodymium oxide ($Nd_2O_3$) from ferric oxide ($Fe_2O_3$).

It has further been discovered, according to the present invention, that the most effective and hazardless method of drying the moist neodymium trifluoride ($NdF_3$) is by using microwave radiation, which only excites the water molecules and dries the moist neodymium trifluoride ($NdF_3$) without creating any toxic gas.

It is therefore a primary object of the present invention to provide a new method for the recovery of neodymium (Nd) from NdFeB swarf which is one of the major waste by-products of rare earth magnet manufacture.

It is also an object of the present invention to provide a new method for the recovery of neodymium (Nd) from NdFeB swarf, wherein sodium hydroxide (NaOH) is used for treating the NdFeB swarf at the initial stage to produce neodymium oxide ($Nd_2O_3$).

It is a further object of the present invention to provide a new method for the recovery of neodymium (Nd) from NdFeB swarf, wherein acetic acid ($HC_2H_3O_2$) is used in the digestion process of the crude obtained from the initial alkali treatment stage, so that only neodymium oxide ($Nd_2O_3$) contained in the crude is dissolved but the ferric oxide ($Fe_2O_3$) remains largely undissolved, which effectively separates neodymium oxide ($Nd_2O_3$) from ferric oxide ($Fe_2O_3$).

It is an additional object of the present invention to provide a new method for the recovery of neodymium (Nd) from NdFeB swarf, including a novel effective and hazardless method of drying the neodymium trifluoride ($NdF_3$). The new effective and hazardless drying method is using microwave radiation to dry the moist neodymium trifluoride ($NdF_3$), which only excites the water molecules and dries the moist neodymium trifluoride ($NdF_3$) without creating any toxic gas.

The basic process of the present invention NdFeB swarf recovery method includes the following steps:

1. mixing an adequate amount of aqueous sodium hydroxide (NaOH) into the grinding swarf which yields a mixture, and grinding the mixture so that the neodymium (Nd) reacts at fresh surface of the sodium hydroxide (NaOH) to produce neodymium oxide ($Nd_2O_3$) contained in a crude that also contains iron powder (Fe), ferric oxide ($Fe_2O_3$) and aqueous sodium hydroxide (NaOH);
2. applying magnetic restrainers to the crude to remove the iron powder (Fe);
3. filtrating the crude and recycling the aqueous sodium hydroxide (NaOH) back to step 1 so that it can be reused;
4. digesting the crude with acetic acid ($HC_2H_3O_2$) having a pK value of approximately 4.7, such that it can dissolve neodymium oxide ($Nd_2O_3$) but not ferric oxide ($Fe_2O_3$), to produce a digested solution containing undissolved ferric oxide ($Fe_2O_3$), neodymium acetate ($Nd(C_2H_3O_2)_3$) which has a solubility between approximately 260 grams per liter at ambient temperature and contains approximately 42% metal by weight, and ferric acetate ($Fe_3(CH_3COO)_6(CH_3COO)_3$) which has a solubility higher than that of neodymium acetate ($Nd(C_2H_3O_2)_3$);
5. discharging the undissolved ferric oxide ($Fe_2O_3$) from the digested solution;
6. evaporating the digested solution to produce neodymium acetate ($Nd(C_2H_3O_2)_3$) crystals, and dislodging a concentrated liquor which contains ferric acetate ($Fe_3(CH_3COO)_6(CH_3COO)_3$) and residual neodymium acetate ($Nd(C_2H_3O_2)_3$);
7. adding hydrofluoric acid (HF) to the neodymium acetate ($Nd(C_2H_3O_2)_3$) crystals to produce neodymium trifluoride ($NdF_3$), which also regenerates acetic acid ($HC_2H_3O_2$);
8. separating the neodymium trifluoride ($NdF_3$) from the acetic acid ($HC_2H_3O_2$), and recycling the acetic acid ($HC_2H_3O_2$) back to step 4 so that it can be reused;
9. drying the neodymium trifluoride ($NdF_3$) by using microwave radiation to produce dry neodymium trifluoride ($NdF_3$) which contains less than approximately 3% moisture;
10. precipitating the concentrated liquor from step 6 with oxalic acid ($H_2C_2O_4$) to convert the residual neodymium acetate ($Nd(C_2H_3O_2)_3$) into neodymium oxalate ($Nd_2(C_2O_3)_3$);
11. removing the ferric acetate ($Fe_3(CH_3COO)_6(CH_3COO)_3$); and
12. treating the neodymium oxalate ($Nd_2(C_2O_3)_3$) with steps 7 through 9 to produce dry neodymium trifluoride ($NdF_3$), and regenerating and recycling said oxalic acid ($H_2C_2O_4$) back to step 10 so that it can be reused.

In addition, it is also known that plating barrels can be utilized in fine metal manufacturing processes. Conventionally in plating operations, the plating barrel is connected to the negative terminal of a direct current (DC) power source and deposition on the barrel contents is effected.

It has been discovered, however, according to the present invention, that the rare earth metals such as neodymium (Nd) cannot be electrodeposited from aqueous solution by connecting the plating barrel to the negative terminal of a DC power source. A modified digestion tank with plating barrel must be used for the electrolysis process, where the plating barrel contains the NdFeB Slag and is connected to the positive terminal of the DC power source, and the tank contains the electrolytic bath and is connected to the negative terminal of the DC power supply, so that the NdFeB slag is anodized into solution and iron (Fe) is deposited on the cathode plates.

It has also been discovered, according to the present invention, that the pH value in the electrolyte rises as the operation proceeds because the deficit of metal irons that are deposable at the cathodes, and such pH value must be periodically adjusted downwardly to facilitate the precipitation of the neodymium accumulation in the bath.

Therefore, it is also a primary object of the present invention to provide a new method for the recovery of neodymium (Nd) from NdFeB slag, another waste by-product material of rare earth magnet manufacture.

It is a further object of the present invention to provide a new method for the recovery of neodymium (Nd) from NdFeB slag, where an electrolysis process can be effected by utilizing a modified plating barrel tank which includes a plating barrel connected to the positive terminal of the DC power source for containing the NdFeB Slag, and an electrolytic bath contained in the tank which is connected to the negative terminal of the DC power supply, so that the NdFeB slag can be anodized into solution while iron (Fe) is deposited on the cathode plates.

It is also an object of the present invention to provide a new method for the recovery of neodymium (Nd) from NdFeB slag, where the pH value of the electrolytic bath is periodically adjusted downwardly to facilitate the precipitation of the neodymium accumulation in the bath.

The basic process of the present invention NdFeB slag recovery method includes the following steps:

1. effectuating an electrolysis process by utilizing a modified electrolyte tank which includes a plating barrel serving as an anode and a circumscribing sheet serving as a cathode, filling the plating barrel with the metallic slag and filling the tank with an electrolyte bath containing sulfamic acid ($NH_2SO_3H$) and having a pH value of approximately 2.7, connecting the plating barrel to a positive terminal of a direct current (DC) power source and the cathode sheet to a negative terminal of the DC power source, so that the metallic slag is anodized into solution as the neodymium (Nd) accumulates in the electrolyte bath while iron (Fe) is deposited on the cathode sheet, and maintaining a current density of approximately 50 ampere per square foot on the cathode until the pH value of the electrolyte bath rises to approximately 3.2;
2. pumping and filtrating approximately one-third of the electrolyte bath into an acidification precipitation tank;
3. adding hydrofluoric acid (HF) to the filtrated electrolyte bath until its pH value drops back to 2.7 to produce neodymium trifluoride ($NdF_3$);
4. separating the neodymium trifluoride ($NdF_3$) and recycling the electrolyte bath back to step 1 so that it can be reused; and
5. drying the neodymium trifluoride ($NdF_3$) by using microwave radiation to produce dry neodymium trifluoride ($NdF_3$) which contains less than approximately 3% moisture.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated.

DESCRIPTION OF THE PREFERRED EMBODIMENT

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

The present invention is a novel method of recovering neodymium (Nd) from waste by-products of rare earth magnet manufacture. There are three primary concerns which are also the objects of the present invention. First, the present invention is aimed at a new method for the recovery of neodymium (Nd) from both of the two major waste by-products of rare earth magnet manufacture, namely the NdFeB swarf and the NdFeB slag. Second, the present invention is aimed at a chemical scheme that requires minimal input of chemical compounds and produces no output of chemical waste. Third, the present invention is aimed at eliminating any hazard to the work place or the environment.

The present invention includes two distinct but related processes to deal with the recovery of neodymium (Nd) from the NdFeB swarf and NdFeB slag, respectively.

1. THE NdFeB SWARF RECOVERY PROCESS

Figure 1:
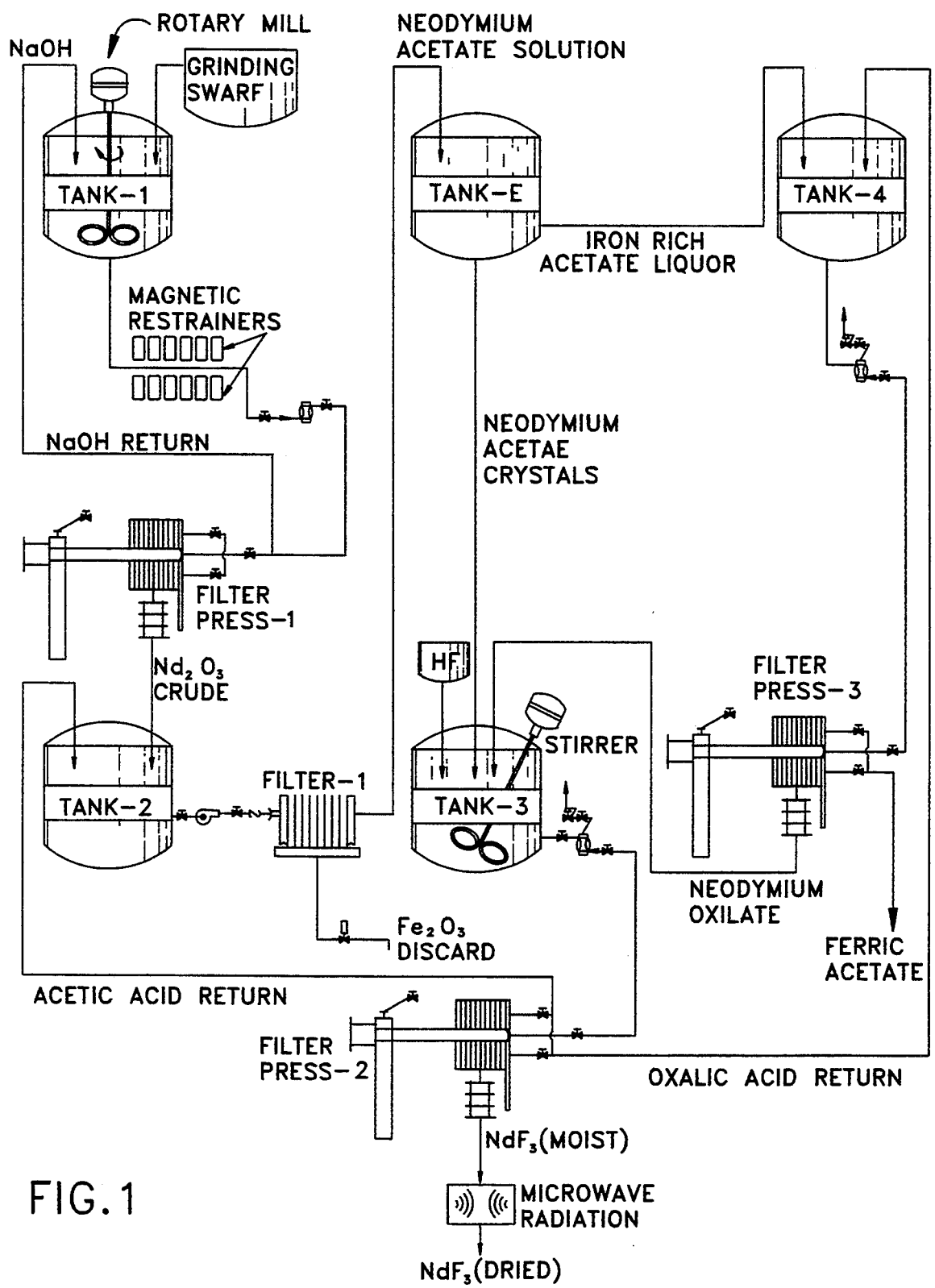
FIG. 1 is a schematic diagram showing the present invention NdFeB swarf recovery process.
Figure 2:
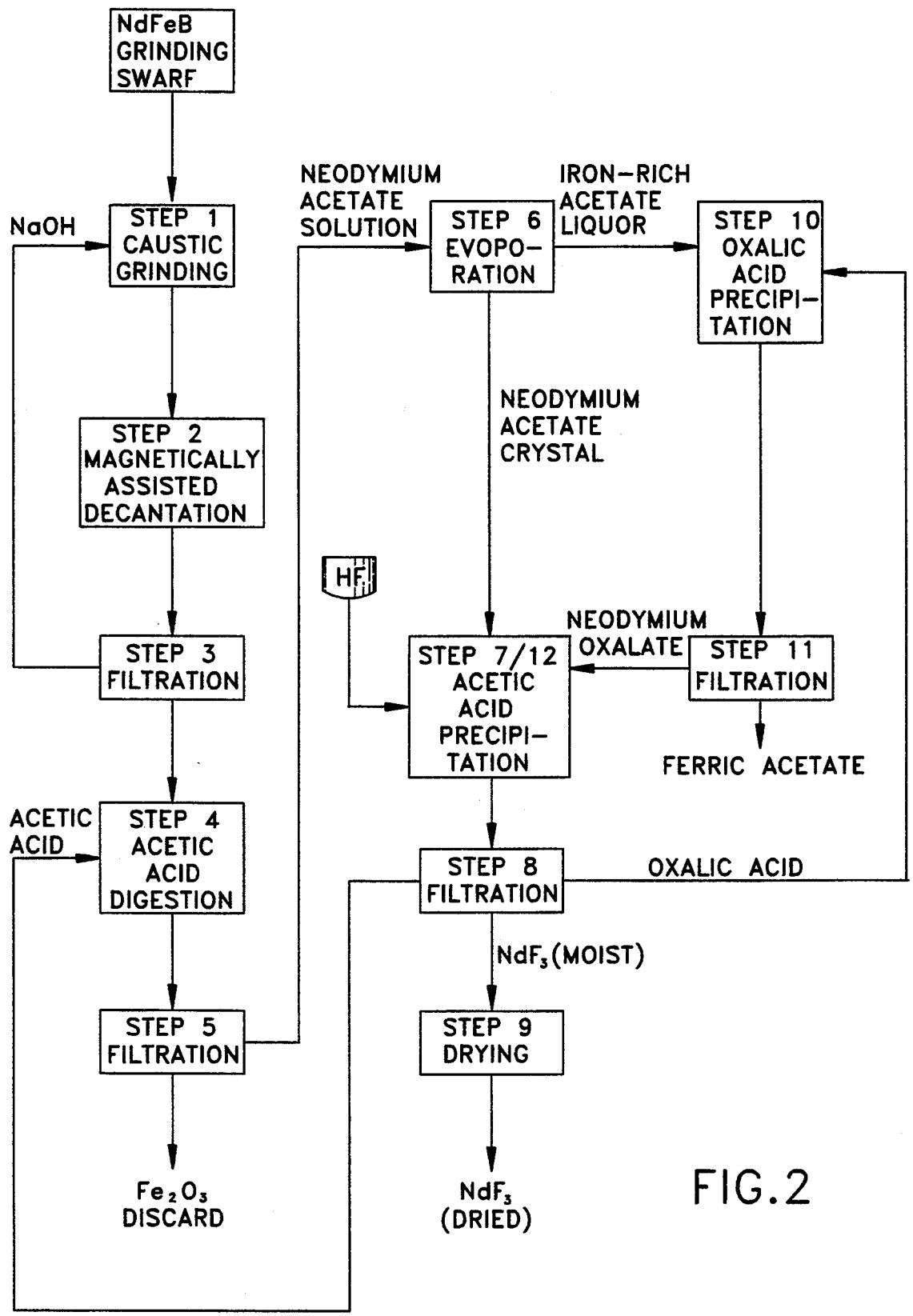
FIG. 2 is a flow chart showing the operation sequence of the present invention NdFeB swarf recovery process.

Referring to FIGS. 1 and 2, the present invention NdFeB swarf recovery process includes essentially twelve (12) steps. The whole process can be repeated until all grinding swarf is processed.

a. Step 1: Caustic Grinding

The first step involves mixing an adequate amount of aqueous sodium hydroxide (NaOH) into the grinding swarf which yields a mixture, and grinding the mixture so that the neodymium (Nd) reacts at fresh surface of the sodium hydroxide (NaOH) to produce neodymium oxide ($Nd_2O_3$) contained in a crude that also contains iron powder (Fe), ferric oxide ($Fe_2O_3$) and aqueous sodium hydroxide (NaOH).

The first step takes place in Tank-1 which has a rotary grinding mill. The chemical equation for this step is as follows:

$$2Nd + 3H_2O = Nd_2O_3 + 3H_{2(g)} \qquad [1]$$

This reaction takes place in the presence of caustic alkali. However, no alkali is consumed by the process and no new waste is generated. The neodymium (Nd) only reacts at the surface with the sodium hydroxide (NaOH) to give hydrogen gas (H$_{2(g)}$) and neodymium oxide (Nd$_2$O$_3$). The grinding process exposes fresh surface continually and allows the oxidation to go to completion.

Step 1 represents one of the many novel characteristics of the present invention NdFeB swarf recovery process. It involves mixing an adequate amount of aqueous sodium hydroxide (NaOH) with the grinding swarf in Tank-1, and grinding the mixture with the rotary mill so that the neodymium (Nd) reacts at the fresh surface of the sodium hydroxide (NaOH). The result of this step is a crude containing neodymium oxide (Nd$_2$O$_3$), iron powder (Fe), ferric oxide (Fe$_2$O$_3$) and aqueous sodium hydroxide (NaOH).

b. Step 2: Magnetic Restraining

The second step involves applying magnetic restrainers to the crude to remove the iron powder (Fe).

The residual iron powder (Fe) from Step 1 is ferromagnetic, but the neodymium oxide (Nd$_2$O$_3$) and ferric oxide (Fe$_2$O$_3$) are not. Placement of magnets about the exit pipe from Tank-1 is made so as to prevent the sweeping out of the iron powder (Fe) along with the oxide slurry. The presence of the ferric oxide (Fe$_2$O$_3$) in the slurry results from the atmosphere reacting with the grinding swarf prior to the caustic grinding.

c. Step 3: Filtration

The third step involves filtrating the crude and recycling the aqueous sodium hydroxide (NaOH) back to step 1 so that it can be reused.

This step is carried out by Filter Press-1. In the filtration of the mixed oxide slurry the caustic liquor (NaOH) is recycled back to Tank-1. It can be reused 5 or 6 cycles with only small augmentation to make up for handling losses.

d. Step 4: Acetic Acid Digestion

The fourth step involves digesting the crude with acetic acid (HC$_2$H$_3$O$_2$) having a pK value of approximately 4.7, such that it can dissolve neodymium oxide (Nd$_2$O$_3$) but not ferric oxide (Fe$_2$O$_3$), to produce a digested solution containing undissolved ferric oxide (Fe$_2$O$_3$), neodymium acetate (Nd(C$_2$H$_3$O$_2$)$_3$) which has a solubility between approximately 260 grams per liter at ambient temperature and contains approximately 42% metal by weight, and ferric acetate (Fe$_3$(CH$_3$COO)$_6$(CH$_3$COO)$_3$) which has a solubility higher than that of neodymium acetate (Nd(C$_2$H$_3$O$_2$)$_3$).

This step takes place in Tank-2. The chemical equation for this step is as follows:

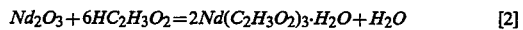

$$Nd_2O_3 + 6HC_2H_3O_2 = 2Nd(C_2H_3O_2)_3 \cdot H_2O + H_2O \quad [2]$$

Step 4 represents another one of the many novel characteristics of the present invention NdFeB swarf recovery process. It is the most important step of the NdFeB swarf recovery process. The use of the weak acid, acetic acid (HC$_2$H$_3$O$_2$), which has a pK value of 4.7, is to dissolve the neodymium oxide (Nd$_2$O$_3$) but to leave the ferric oxide (Fe$_2$O$_3$) largely undissolved. Ferric oxide (Fe$_2$O$_3$) is more acidic than the strongly basic neodymium oxide (Nd$_2$O$_3$) and will not dissolve appreciably in weak acid. It will largely be left as a residue to be separated from the neodymium acetate (Nd(C$_2$H$_3$O$_2$)$_3$) solution by filtration.

A small amount of iron will be converted to ferric acetate (Fe$_3$(CH$_3$COO)$_6$(CH$_3$COO)$_3$), but the acetate of trivalent iron is fundamentally different than that of neodymium, and necessarily will have different chemical properties. Neodymium acetate (Nd(C$_2$H$_3$O$_2$)$_3$) is a simple ionic salt, whereas ferric acetate (Fe$_3$(CH$_3$COO)$_6$(CH$_3$COO)$_3$) is a complex salt. This fundamental difference sets up a huge difference in solubilities. The solubility of neodymium acetate (Nd(C$_2$H$_3$O$_2$)$_3$) is limited, while that of the ferric acetate (Fe$_3$(CH$_3$COO)$_6$(CH$_3$COO)$_3$) is virtually unlimited.

The neodymium acetate (Nd(C$_2$H$_3$O$_2$)$_3$) has a solubility of 260 gram/liter at room temperature, which allows the operational volumes to be kept at reasonable levels, while it is still far lower than that of ferric acetate (Fe$_3$(CH$_3$COO)$_6$(CH$_3$COO)$_3$). The neodymium acetate (Nd(C$_2$H$_3$O$_2$)$_3$) is approximately 42% metal by weight.

e. Step 5: Filtration

The fifth step involves discharging the undissolved ferric oxide (Fe$_2$O$_3$) from the digested solution.

This step is carried out by Filter-1 which is a simple filter. Step 5 is a simple filtration of the acetate acid (HC$_2$H$_3$O$_2$) digested solution obtained from step 4.

f. Step 6: Evaporation

The sixth step involves evaporating the digested solution to produce neodymium acetate (Nd(C$_2$H$_3$O$_2$)$_3$) crystals, and dislodging a concentrated liquor which contains ferric acetate (Fe$_3$(CH$_3$COO)$_6$(CH$_3$COO)$_3$) and residual neodymium acetate (Nd(C$_2$H$_3$O$_2$)$_3$).

This step takes place in evaporator Tank-E. Water is evaporated and neodymium acetate (Nd(C$_2$H$_3$O$_2$)$_3$) collects at the bottom of the tank. The remaining iron-rich acetate liquor is pumped off, which will be treated later in steps 10 through 12.

Since ferric acetate (Fe$_3$(CH$_3$COO)$_6$(CH$_3$COO)$_3$) and neodymium acetate (Nd(C$_2$H$_3$O$_2$)$_3$) have a vast difference in solubilities, that of neodymium acetate (Nd(C$_2$H$_3$O$_2$)$_3$) being limited while that of the ferric acetate (Fe$_3$(CH$_3$COO)$_6$(CH$_3$COO)$_3$) being virtually unlimited, evaporation of the liquor gives neodymium acetate (Nd(C$_2$H$_3$O$_2$)$_3$) monohydrate in highly pure, lilac-colored crystals of remarkable beauty. In prior art recovery processes, the neodymium-sulfate salts cannot be crystallized from aqueous solution with such high purity.

g. Step 7: Acetic Acid Precipitation

The seventh step involves adding hydrofluoric acid (HF) to the neodymium acetate (Nd(C$_2$H$_3$O$_2$)$_3$) crystals to produce neodymium trifluoride (NdF$_3$), which also regenerates acetic acid (HC$_2$H$_3$O$_2$).

This step takes place in Tank-3. The collected neodymium acetate (Nd(C$_2$H$_3$O$_2$)$_3$) crystals are dropped into Tank-3, wherein hydrofluoric acid (HF) is added while simultaneously stirred by the stirrer. Neodymium trifluoride (NdF$_3$) is formed, and acetic acid (HC$_2$H$_3$O$_2$) remains in the solution as neodymium trifluoride (NdF$_3$) is highly insoluble. The chemical equation for this step is as follows:

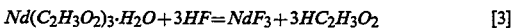

$$Nd(C_2H_3O_2)_3 \cdot H_2O + 3HF = NdF_3 + 3HC_2H_3O_2 \quad [3]$$

h. Step 8: Filtration

The eighth step involves separating the neodymium trifluoride (NdF$_3$) from the acetic acid (HC$_2$H$_3$O$_2$), and recycling the acetic acid (HC$_2$H$_3$O$_2$) back to step 4 so that it can be reused.

This step is carried out by Filter Press-2. The neodymium trifluoride (NdF$_3$) separated by Filter Press-3 contains a considerable amount of moisture and needs to be dried.

i. Step 9: Drying

The ninth step involves drying the neodymium trifluoride (NdF$_3$) by using microwave radiation to produce dry neodymium trifluoride (NdF$_3$) which contains less than approximately 3% moisture.

Step 9 represents an additional one of the many novel characteristics of the present invention NdFeB swarf recovery process. Prior art drying methods such as air or thermal drying or heating have presented all sorts of problems as previously discussed. The present invention utilizes microwave radiation which only excites the water molecules, and thereby dries the neodymium trifluoride (NdF$_3$) without creating the problems encountered by prior art drying methods.

j. Step 10: Oxalic Acid Precipitation

The tenth step involves precipitating the concentrated liquor from step 6 with oxalic acid (H$_2$C$_2$O$_4$) to convert the residual neodymium acetate (Nd(C$_2$H$_3$O$_2$)$_3$) into neodymium oxalate (Nd$_2$(C$_2$O$_3$)$_3$).

This step takes place in Tank-4. The residual liquor from the evaporation step, step 6, contains all the iron that has leaked into the process through the barriers to iron inclusion. The liquor in its concentrated form will begin to cling to the additionally formed neodymium acetate (Nd(C$_2$H$_3$O$_2$)$_3$) crystals at about 90% neodymium (Nd) recovery level. To avoid the loss of the remaining 10% neodymium (Nd), precipitation of the remaining neodymium with oxalic acid (H$_2$C$_2$O$_4$) is effected. The chemical equation for this step is as follows:

$$2Nd(C_2H_3O_2)_3 + 3H_2C_2O_4 = Nd_2(C_2O_4)_3 + 6HC_2H_3O_2 \quad [4]$$

Since the oxalic acid (H$_2$C$_2$O$_4$) is regenerated in the subprocess, there is no additional chemical cost.

k. Step 11: Filtration

The eleventh step involves removing the ferric acetate (Fe$_3$(CH$_3$COO)$_6$(CH$_3$COO)$_3$).

This step is carried out by the Filter Press-3. The ferric acetate (Fe$_3$(CH$_3$COO)$_6$(CH$_3$COO)$_3$) solution can easily be converted to basic ferric acetate which is an article of commerce in the textile manufacturing business. This would eliminate the need to treat this small iron containing stream.

l. Step 12: Acetic Acid Precipitation

The twelfth step involves treating the neodymium oxalate (Nd$_2$(C$_2$O$_3$)$_3$) with steps 7 through 9 to produce dry neodymium trifluoride (NdF$_3$), and regenerating and recycling the oxalic acid (H$_2$C$_2$O$_4$) back to step 10 so that it can be reused.

The chemical equation for this step is as follows:

$$2Nd_2(C_2O_4)_3 + 6HF = 2NdF_3 + 3H_2C_2O_4 \quad [5]$$

It is noted that steps 10 through 12 are severable from steps 1 through 9. Since the volume of the evaporate liquor is so much smaller than the starting volumes, the concentrated liquor out of evaporation may be stored and treated only once for each 8 to 10 cycles of steps 1 through 9. Much of the existing equipment can be used, for example Tank-3 and Filter Press-2 used in steps 7 and 8 respectively.

2. NdFeB SLAG RECOVERY PROCESS

Figure 3:
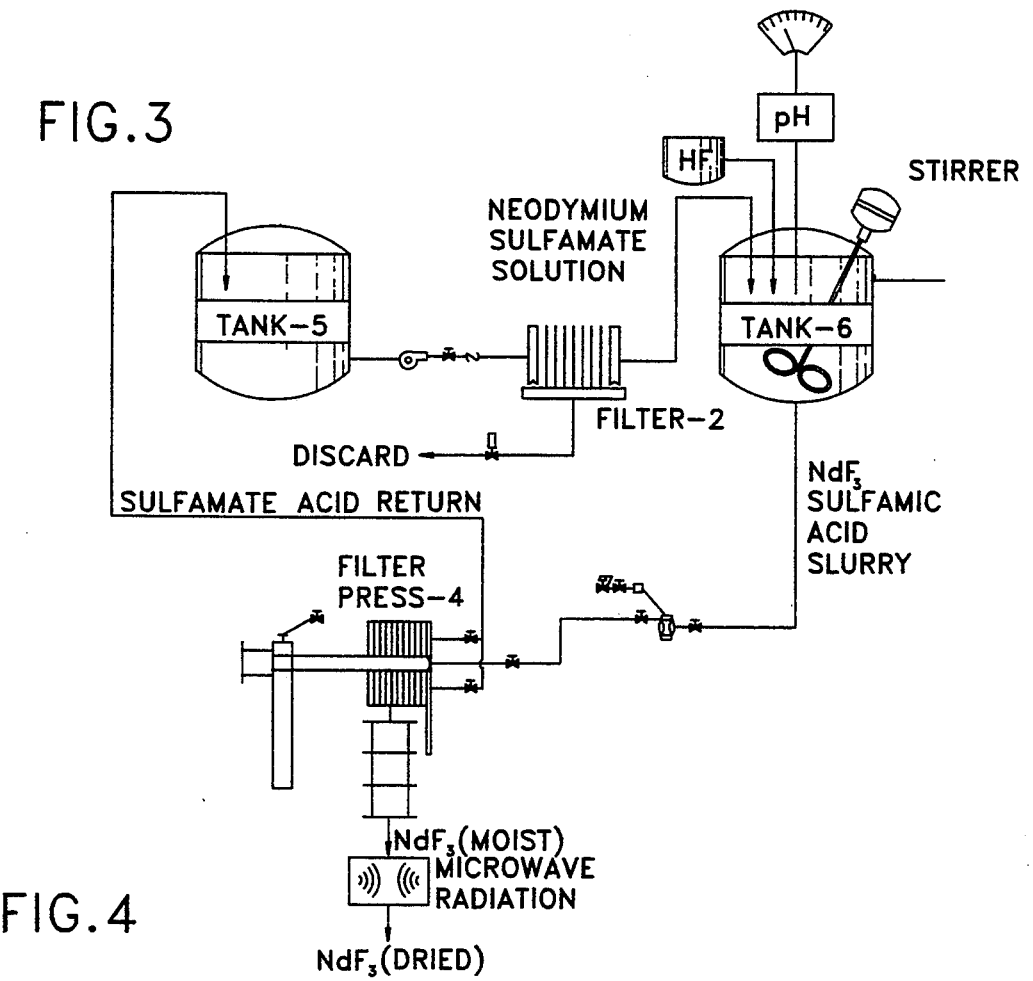
FIG. 3 is a schematic diagram showing the present invention NdFeB slag recovery process.
Figure 4:
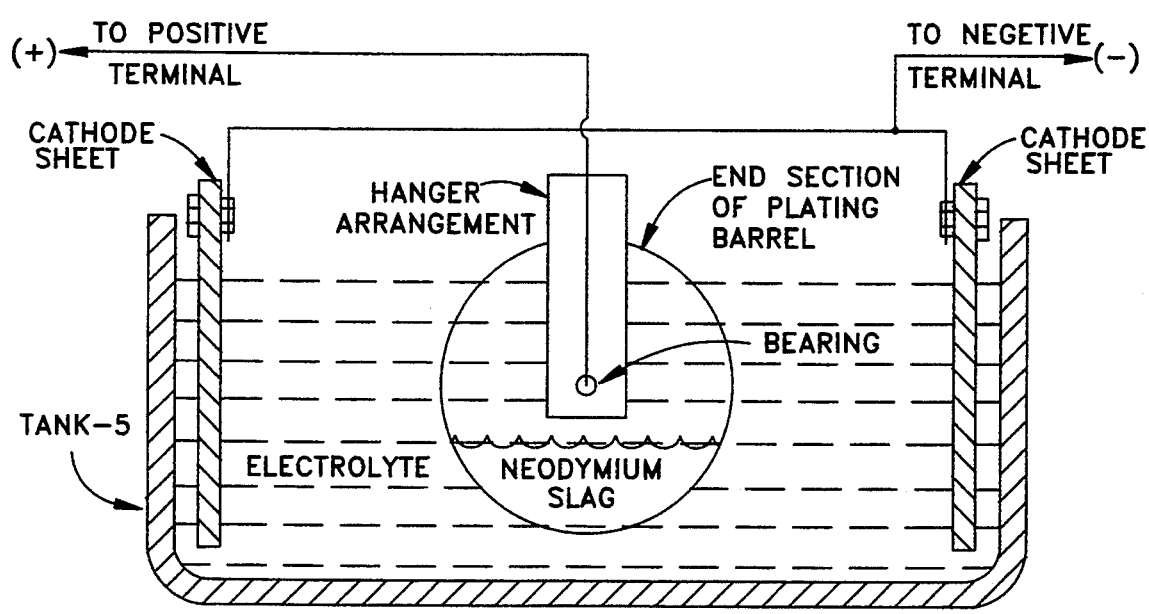
FIG. 4 is a schematic diagram showing the detailed arrangement of the modified plating barrel electrolyte tank used in the present invention NdFeB slag recovery process.
Figure 5:
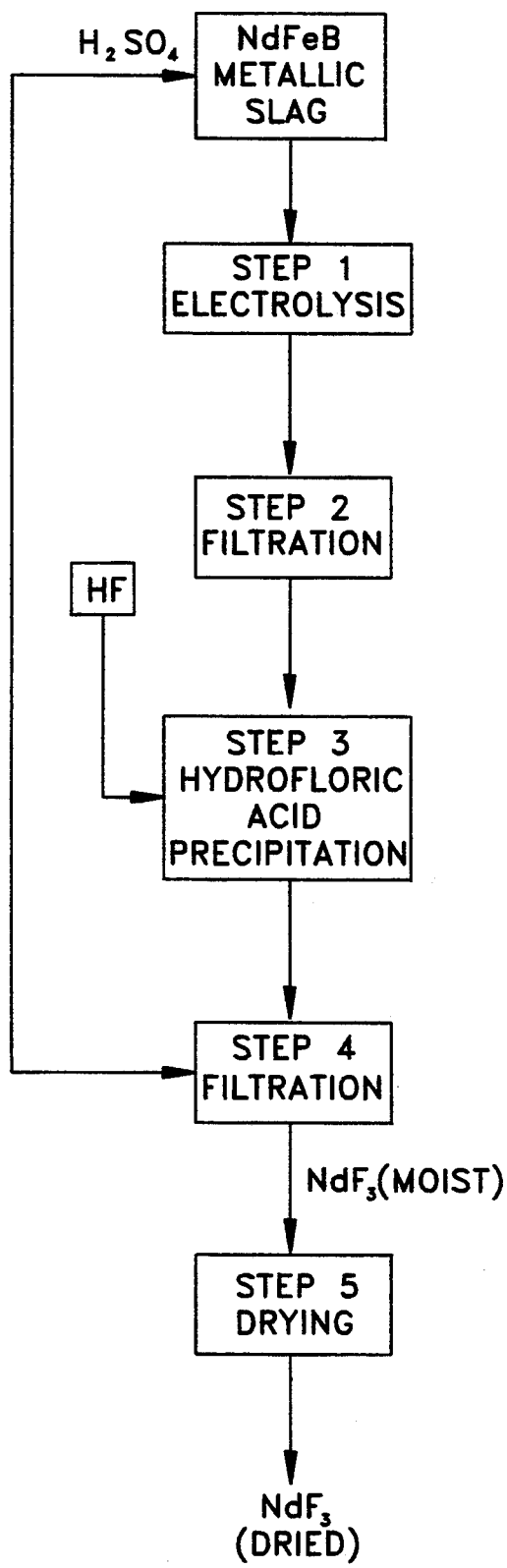
FIG. 5 is a flow chart showing the operation sequence of the present invention NdFeB slag recovery process.

Referring to FIGS. 3 through 5, the present invention NdFeB slag recovery process includes essentially five (5) steps. The whole process can be repeated until all metallic slag is processed.

a. Step 1: Electrolysis

The first step involves effectuating an electrolysis process by utilizing a modified electrolyte tank which includes a plating barrel serving as an anode and a circumscribing sheet serving as a cathode, filling the plating barrel with the metallic slag and filling the tank with an electrolyte bath containing sulfamic acid (NH$_2$SO$_3$H) and having a pH value of approximately 2.7, connecting the plating barrel to a positive terminal of a direct current (DC) power source and the cathode sheet to a negative terminal of the DC power source, so that the metallic slag is anodized into solution as the neodymium (Nd) accumulates in the electrolyte bath while iron (Fe) is deposited on the cathode sheet, and maintaining a current density of approximately 50 ampere per square foot on the cathode until the pH value of the electrolyte bath rises to approximately 3.2.

This step takes place in modified electrolysis Tank-5. Since the plating barrel is connected to the positive terminal of the DC power source, the NdFeB slag is anodized into solution. The chemical half-reaction equation of this step is as follows:

$$Nd \rightarrow Nd^{3+} + 3e^- \quad [6]$$

$$Fe \rightarrow Fe^{2+} + 2e^- \quad [7]$$

Simultaneously, Neodymium (Nd) is accumulated in the electrolyte bath while the iron (Fe) dissolved at the anode is deposited on the cathode sheet:

$$2e^- + Fe^{2+} = Fe_{(s)} \quad [8]$$

The pH in the electrolyte bath rises as hydrogen (H) is deposited:

$$2e^- + 2H_2O \rightarrow 2OH^- + H_{2(g)} \quad [9]$$

That is, water is reduced, producing hydroxyl ion (OH$^-$) and hydrogen gas (H$_2$).

Step 1 represents one of the many novel characteristics of the present invention NdFeB slag recovery process. The composition of the electrolyte bath has been the subject of more than two-hundred (200) experiments by the inventor. To constitute the electrolyte bath from scratch, a solution of 150 gram/liter of sulfamic acid (NH$_2$SO$_3$H) is mixed with the NdFeB slag with agitation until, by the consumption of some of the acid, the pH value rises to 2.7. The solution is then filtered into electrolysis Tank-5. Additional NdFeB slag is filled into the plating barrel and electrolysis begins. A current density of 50 ampere/ft$^2$ at the cathode sheet is maintained until the pH rises to 3.2. At this point the electrolysis is interrupted.

It is noted that the iron deposited on the cathode sheet is pure iron metal, which can be collected for use in the manufacturing industries.

b. Step 2: Filtration

The second step involves pumping and filtrating approximately one-third of the electrolyte bath into an acidification precipitation tank.

This step is carried out by Filter-2. When the pH value of the electrolyte bath in Tank-5 rises to 3.2, the electrolysis is interrupted and one-third of the electrolyte bath is pumped out and filtrated through Filter-2 into Tank-6.

c. Step 3: Hydrofluoric Acid Precipitation

The third step involves adding hydrofluoric acid (HF) to the filtrated electrolyte bath until its pH value drops back to 2.7 to produce neodymium trifluoride (NdF$_3$).

This step takes place in Tank-6. Hydrofluoric acid (HF) is added therein until the pH reaches 2.7 again. The pH value is constantly detected by a pH monitor. Neodymium trifluoride ($NdF_3$) precipitates in Tank-6, and it is allowed to settle.

d. Step 4: Filtration

The fourth step involves separating the neodymium trifluoride ($NdF_3$) and recycling the electrolyte bath back to step 1 so that it can be reused.

This step is carried out by Filter Press-4. The slurry from Tank-6 is pumped through Filter Press-4, where the precipitate of neodymium trifluoride ($NdF_3$) is retained and the filtrate containing sulfamic acid ($NH_2SO_3H$) is recycled back to Tank-5.

It is noted that the sulfamic acid ($NH_2SO_3H$) is not consumed in the process and therefore presents no environmental hazard.

e. Step 5: Drying

The fifth step involves drying the neodymium trifluoride ($NdF_3$) by using microwave radiation to produce dry neodymium trifluoride ($NdF_3$) which contains less than approximately 3% moisture. This step is the same as step 9 of the NdFeB swarf recovery process.

3. THE COMPLETE OPERATION OF NEODYMIUM RECOVERY

Figure 6:
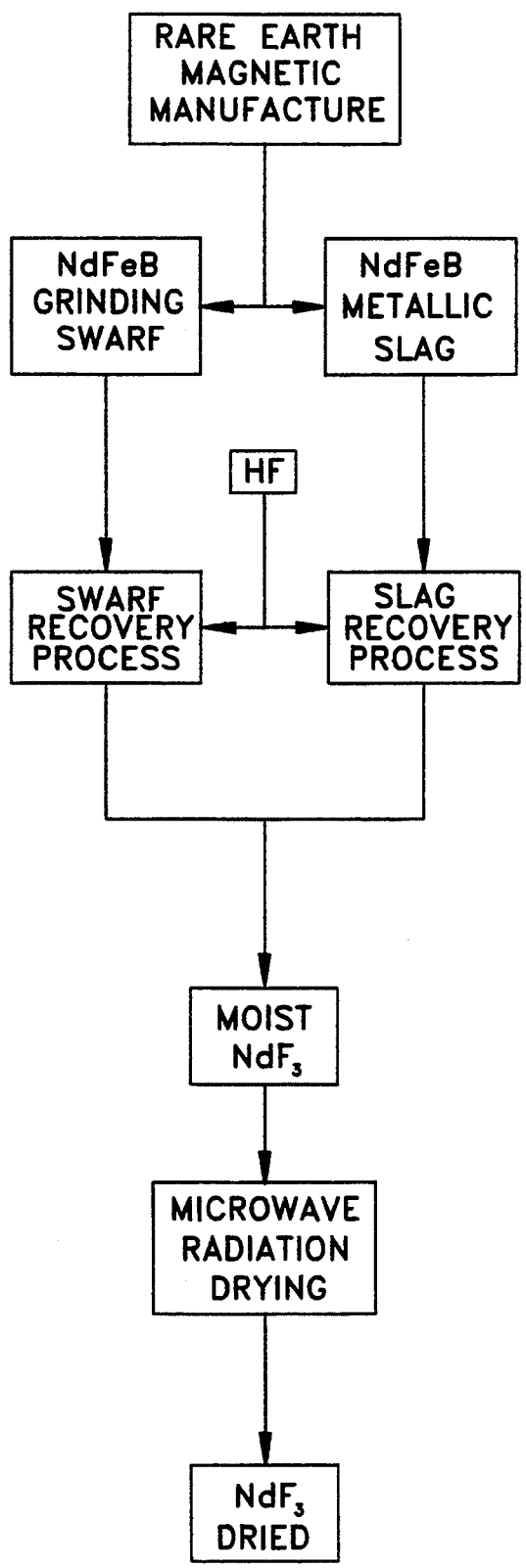
FIG. 6 is a flow chart showing the overall operation of the present invention neodymium (Nd) recovery method.

Referring to FIG. 6, there is shown a flow chart of the complete recovery operation. The waste by-products, NdFeB swarf and NdFeB slag, from the rare earth magnetic manufacture are treated by two respective chemical schemes as described above. However, the only major consumption of chemical compound is hydrofluoric acid (HF). The moist neodymium trifluoride ($NdF_3$) produced by both schemes can be dried by using the same microwave radiation technique to produce dry neodymium trifluoride ($NdF_3$) which contains less than 3% moisture.

The present invention method for the recovery of neodymium (Nd) from NdFeB swarf and slag has many advantageous features. It achieves a very high efficiency of neodymium (Nd) recovery: over 95% of neodymium (Nd) in the magnet manufacture wastes is recovered. It also incurs only minimal chemical and energy costs: only Hydrofluoric Acid (HF) is consumed and all steps are carried out at ambient temperature. It further conforms with high safety standard: minimal waste generation, no hazardous waste, and minimal work place hazards. In addition, it requires a very low capital cost for industrial scale operation; standard chemical plant equipment can be easily modified to suit the need of the present invention process. Moreover, it yields a high product purity. Finally, it also produces many other valuable by-products, such as pure iron metal, which can be utilized in the manufacturing industries.

Defined in detail, the present invention is a process for recovering neodymium (Nd) from a grinding swarf containing neodymium (Nd) and massive iron (Fe), comprising the steps of: (a) mixing an adequate amount of aqueous sodium hydroxide (NaOH) into said grinding swarf which yields a mixture, and grinding the mixture so that said neodymium (Nd) reacts at fresh surface of the sodium hydroxide (NaOH) to produce neodymium oxide ($Nd_2O_3$) contained in a crude that also contains iron powder (Fe), ferric oxide ($Fe_2O_3$) and aqueous sodium hydroxide (NaOH); (b) applying magnetic restrainers to said crude to remove said iron powder (Fe); (c) filtrating said crude and recycling said aqueous sodium hydroxide (NaOH) back to step "a" so that it can be reused; (d) digesting said crude with acetic acid ($HC_2H_3O_2$) having a pK value of approximately 4.7, such that it can dissolve neodymium oxide ($Nd_2O_3$) but not ferric oxide ($Fe_2O_3$), to produce a digested solution containing undissolved ferric oxide ($Fe_2O_3$), neodymium acetate ($Nd(C_2H_3O_2)_3$) which has a solubility between approximately 260 grams per liter at ambient temperature and contains approximately 42% metal by weight, and ferric acetate ($Fe_3(CH_3COO)_6(CH_3COO)_3$) which has a solubility higher than that of neodymium acetate ($Nd(C_2H_3O_2)_3$); (e) discharging said undissolved ferric oxide ($Fe_2O_3$) from said digested solution; (f) evaporating said digested solution to produce neodymium acetate ($Nd(C_2H_3O_2)_3$) crystals, and dislodging a concentrated liquor which contains ferric acetate ($Fe_3(CH_3COO)_6(CH_3COO)_3$) and residual neodymium acetate ($Nd(C_2H_3O_2)_3$); (g) adding hydrofluoric acid (HF) to said neodymium acetate ($Nd(C_2H_3O_2)_3$) crystals to produce neodymium trifluoride ($NdF_3$), which also regenerates acetic acid ($HC_2H_3O_2$); (h) separating said neodymium trifluoride ($NdF_3$) from said acetic acid ($HC_2H_3O_2$), and recycling said acetic acid ($HC_2H_3O_2$) back to step "d" so that it can be reused; (i) drying said neodymium trifluoride ($NdF_3$) by using microwave radiation to produce dry neodymium trifluoride ($NdF_3$) which contains less than approximately 3% moisture; (j) precipitating said concentrated liquor from step "f" with oxalic acid ($H_2C_2O_4$) to convert said residual neodymium acetate ($Nd(C_2H_3O_2)_3$) into neodymium oxalate ($Nd_2(C_2O_3)_3$); (k) removing said ferric acetate ($Fe_3(CH_3COO)_6(CH_3COO)_3$); (l) treating said neodymium oxalate ($Nd_2(C_2O_3)_3$) with steps "g" through "i" to produce dry neodymium trifluoride ($NdF_3$), and regenerating and recycling said oxalic acid ($H_2C_2O_4$) back to step "j" so that it can be reused; and (m) repeating steps "a" through "l" until said grinding swarf is completely processed.

Defined also in detail, the present invention is a process for recovering neodymium (Nd) from a metallic slag containing neodymium (Nd) and massive iron (Fe), comprising the steps of: (a) effectuating an electrolysis process by utilizing a modified electrolyte tank which includes a plating barrel serving as an anode and a circumscribing sheet serving as a cathode, filling the plating barrel with said metallic slag and filling the tank with an electrolyte bath containing sulfamic acid ($NH_2SO_3H$) and having a pH value of approximately 2.7, connecting the plating barrel to a positive terminal of a direct current (DC) power source and the cathode sheet to a negative terminal of the DC power source, so that said metallic slag is anodized into solution as the neodymium (Nd) accumulates in the electrolyte bath while iron (Fe) is deposited on the cathode sheet, and maintaining a current density of approximately 50 ampere per square foot on the cathode until the pH value of the electrolyte bath rises to approximately 3.2; (b) collecting said iron deposited on said cathode sheet; (c) pumping and filtrating approximately one-third of said electrolyte bath into an acidification precipitation tank; (d) adding hydrofluoric acid (HF) to said filtrated electrolyte bath until its pH value drops back to 2.7 to produce neodymium trifluoride ($NdF_3$); (e) separating said neodymium trifluoride ($NdF_3$) and recycling said electrolyte bath back to step "a" so that it can be reused; (f) drying said neodymium trifluoride ($NdF_3$) by using microwave radiation to produce dry neodymium trifluoride ($NdF_3$) which contains less than approximately 3% moisture; and (g) repeating steps "a" through "f" until said metallic slag is completely processed.

Defined broadly, the present invention is a process for recovering neodymium (Nd) from a grinding swarf containing neodymium (Nd) and massive iron (Fe), comprising the steps of: (a) mixing an adequate amount of aqueous sodium hydroxide (NaOH) into said grinding swarf which yields a mixture, and grinding the mixture to produce neodymium oxide ($Nd_2O_3$) contained in a crude that also contains iron powder (Fe), ferric oxide ($Fe_2O_3$) and aqueous sodium hydroxide (NaOH); (b) applying magnetic restrainers to said crude to remove said iron powder (Fe); (c) filtrating said crude and recycling said aqueous sodium hydroxide (NaOH) back to step "a" so that it can be reused; (d) digesting said crude with acetic acid ($HC_2H_3O_2$) having a pK value between approximately 4 and 5, such that it can dissolve neodymium oxide ($Nd_2O_3$) but not ferric oxide ($Fe_2O_3$), to produce a digested solution containing undissolved ferric oxide ($Fe_2O_3$), neodymium acetate ($Nd(C_2H_3O_2)_3$), and ferric acetate ($Fe_3(CH_3COO)_6(CH_3COO)_3$) which has a solubility higher than that of neodymium acetate ($Nd(C_2H_3O_2)_3$); (e) discharging said undissolved ferric oxide ($Fe_2O_3$) from said digested solution; (f) evaporating said digested solution to produce neodymium acetate ($Nd(C_2H_3O_2)_3$) crystals; (g) adding hydrofluoric acid (HF) to said neodymium acetate ($Nd(C_2H_3O_2)_3$) crystals to produce neodymium trifluoride ($NdF_3$), which also regenerates acetic acid ($HC_2H_3O_2$); (h) separating said neodymium trifluoride ($NdF_3$) from said acetic acid ($HC_2H_3O_2$), and recycling said acetic acid ($HC_2H_3O_2$) back to step "d" so that it can be reused; (i) drying said neodymium trifluoride ($NdF_3$) by using microwave radiation to produce dry neodymium trifluoride ($NdF_3$); and (j) repeating steps "a" through "i" until said grinding swarf is completely processed.

Defined also broadly, the present invention is a process for recovering neodymium (Nd) from a metallic slag containing neodymium (Nd) and massive iron (Fe), comprising the steps of: (a) effectuating an electrolysis process by utilizing a modified electrolyte tank which includes a plating barrel serving as an anode and a circumscribing sheet serving as a cathode, filling the plating barrel with said metallic slag and filling the tank with an electrolyte bath containing sulfamic acid ($NH_2SO_3H$) and having a pH value between approximately 2.5 to 3, connecting the plating barrel to a positive terminal of a direct current (DC) power source and the cathode sheet to a negative terminal of the DC power source, so that said metallic slag is anodized into solution as the neodymium (Nd) accumulates in the electrolyte bath, and maintaining an adequate current density on the cathode until the pH value of the electrolyte bath rises to between approximately 3 to 3.5; (b) adding hydrofluoric acid (HF) to a filtrated amount of said electrolyte bath until its pH value drops back to between approximately 2.5 to 3 to produce neodymium trifluoride ($NdF_3$); and (c) drying said neodymium trifluoride ($NdF_3$) by using microwave radiation to produce dry neodymium trifluoride ($NdF_3$).

Defined more broadly, the present invention is a process for recovering neodymium (Nd) from a grinding swarf containing neodymium (Nd) and massive iron (Fe), comprising the steps of: (a) mixing an adequate amount of aqueous sodium hydroxide (NaOH) into said grinding swarf which yields a mixture, and grinding the mixture to produce a crude containing neodymium oxide ($Nd_2O_3$); (b) digesting said crude with acetic acid ($HC_2H_3O_2$) to produce a digested solution containing dissolved neodymium acetate ($Nd(C_2H_3O_2)_3$); (c) evaporating said digested solution to produce neodymium acetate ($Nd(C_2H_3O_2)_3$) crystals, and adding hydrofluoric acid (HF) to the neodymium acetate ($Nd(C_2H_3O_2)_3$) crystals to produce neodymium trifluoride ($NdF_3$); and (d) drying said neodymium trifluoride ($NdF_3$) by using microwave radiation to produce dry neodymium trifluoride ($NdF_3$).

Defined even more broadly, the present invention is an initial grinding method for a process of recovering neodymium (Nd) from grinding swarf, which is an industrial waste by-product of rare earth magnet manufacture and contains neodymium (Nd), the initial grinding method comprising the steps of mixing an adequate amount of aqueous sodium hydroxide (NaOH) into the grinding swarf which yields a mixture, and grinding the mixture so that the neodymium (Nd) reacts at fresh surface of the sodium hydroxide (NaOH) to produce a crude containing neodymium oxide ($Nd_2O_3$).

Defined also even more broadly, the present invention is a digesting method for a process of recovering neodymium (Nd) from industrial waste by-products of rare earth magnet manufacture, during which process a crude containing neodymium oxide ($Nd_2O_3$) and ferric oxide ($Fe_2O_3$) is generated, the digesting method comprising the step of digesting the crude with acetic acid ($HC_2H_3O_2$) having a pK value of approximately 4.7, such that it can dissolve neodymium oxide ($Nd_2O_3$) but not ferric oxide ($Fe_2O_3$), to produce a digested solution containing neodymium acetate ($Nd(C_2H_3O_2)_3$) and undissolved ferric oxide ($Fe_2O_3$).

Defined again even more broadly, the present invention is a drying method for a process of recovering neodymium (Nd) from industrial waste by-products of rare earth magnet manufacture, which process yields a moist neodymium trifluoride ($NdF_3$), the drying method comprising the step of using microwave radiation to dry the moist neodymium trifluoride ($NdF_3$).

Defined alternatively in detail, the present invention is an apparatus for recovering neodymium (Nd) from a grinding swarf containing neodymium (Nd) and massive iron (Fe), comprising: (a) a grinding tank with rotary mill for mixing an adequate amount of aqueous sodium hydroxide (NaOH) into said grinding swarf which yields a mixture, and grinding the mixture to produce neodymium oxide ($Nd_2O_3$) contained in a crude that also contains iron powder (Fe), ferric oxide ($Fe_2O_3$) and aqueous sodium hydroxide (NaOH); (b) a multiplicity of magnetic restrainers applied to said crude for removing said iron powder (Fe); (c) a first filter press for filtrating said crude; (d) an acetate acid digestion tank for digesting said crude with acetic acid ($HC_2H_3O_2$) having a pK value between approximately 4 and 5, such that it can dissolve neodymium oxide ($Nd_2O_3$) but not ferric oxide ($Fe_2O_3$), to produce a digested solution containing undissolved ferric oxide ($Fe_2O_3$), neodymium acetate ($Nd(C_2H_3O_2)_3$), and ferric acetate ($Fe_3(CH_3COO)_6(CH_3COO)_3$) which has a solubility higher than that of neodymium acetate ($Nd(C_2H_3O_2)_3$); (e) a first filter for discharging said undissolved ferric oxide ($Fe_2O_3$) from said digested solution; (f) an evaporation tank for evaporating said digested solution to produce neodymium acetate ($Nd(C_2H_3O_2)_3$) crystals; (g) a hydrofluoric acid precipitation tank for precipitation said neodymium acetate ($Nd(C_2H_3O_2)_3$) crystals with hydrofluoric acid (HF) to produce neodymium trifluoride ($NdF_3$), which also regenerates acetic acid ($HC_2H_3O_2$); (h) a second filter press for separating said neodymium trifluoride ($NdF_3$) from said acetic acid ($HC_2H_3O_2$); and (i) a microwave radiation device for drying said neodymium trifluoride ($NdF_3$) by using microwave radiation to produce dry neodymium trifluoride ($NdF_3$).

Defined also alternatively and broadly, the present invention is an apparatus for recovering neodymium (Nd) from a grinding swarf containing neodymium (Nd) and massive iron (Fe), comprising: (a) a grinding tank for mixing an adequate amount of aqueous sodium hydroxide (NaOH) into said grinding swarf which yields a mixture, and grinding the mixture to produce a crude containing neodymium oxide ($Nd_2O_3$); (b) a digestion tank for digesting said crude with acetic acid ($HC_2H_3O_2$) to produce a digested solution containing dissolved neodymium acetate ($Nd(C_2H_3O_2)_3$); (c) an evaporation tank for evaporating said digested solution to produce neodymium acetate ($Nd(C_2H_3O_2)_3$) crystals, and adding hydrofluoric acid (HF) to the neodymium acetate ($Nd(C_2H_3O_2)_3$) crystals to produce neodymium trifluoride ($NdF_3$); and (d) means utilizing microwave radiation for drying said neodymium trifluoride ($NdF_3$).

Defined also alternatively and broadly, the present invention is an apparatus for recovering neodymium (Nd) from a metallic slag containing neodymium (Nd) and massive iron (Fe), comprising the steps of: (a) a modified electrolyte tank for effectuating an electrolysis process, the modified electrolyte tank including a plating barrel connected to a positive terminal of a direct current (DC) power source and serving as an anode, and a circumscribing sheet connected to a negative terminal of the DC power source and serving as a cathode, the plating barrel filled with said metallic slag and the tank filled with an electrolyte bath containing sulfamic acid ($NH_2SO_3H$) and having a pH value between approximately 2.5 to 3, and the cathode supplied with an adequate current density until the pH value of the electrolyte bath rises to between approximately 3 to 3.5 so that said metallic slag is anodized into solution as the neodymium (Nd) accumulates in the electrolyte bath; (b) a precipitation tank for adding hydrofluoric acid (HF) to a filtrated amount of said electrolyte bath until its pH value drops back to between approximately 2.5 to 3 to produce neodymium trifluoride ($NdF_3$); and (c) a microwave radiation means for drying said neodymium trifluoride ($NdF_3$) by using microwave radiation to produce dry neodymium trifluoride ($NdF_3$).

Of course the present invention is not intended to be restricted to any particular form or arrangement, or any specific embodiment disclosed herein, or any specific use, since the same may be modified in various particulars or relations without departing from the spirit or scope of the claimed invention hereinabove shown and described of which the apparatus shown is intended only for illustration and for disclosure of an operative embodiment and not to show all of the various forms or modification in which the present invention might be embodied or operated.

The present invention has been described in considerable detail in order to comply with the patent laws by providing full public disclosure of at least one of its forms. However, such detailed description is not intended in any way to limit the broad features or principles of the present invention, or the scope of patent monopoly to be granted.

What is claimed is:

1. A process for recovering neodymium (Nd) from a grinding swarf containing neodymium (Nd) and massive iron (Fe), comprising the steps of:
   a. mixing aqueous sodium hydroxide (NaOH) into said grinding swarf which yields a mixture, and grinding the mixture to produce neodymium oxide ($Nd_2O_3$) contained in a crude that also contains iron powder (Fe), ferric oxide ($Fe_2O_3$) and aqueous sodium hydroxide (NaOH);
   b. applying magnetic restrainers to said crude to remove said iron powder (Fe);
   c. filtering said crude and recycling said aqueous sodium hydroxide (NaOH) back to step "a" so that it can be reused;
   d. digesting said crude with acetic acid ($HC_2H_3O_2$) to dissolve neodymium oxide ($Nd_2O_3$) but not ferric oxide ($Fe_2O_3$), and to produce a digested solution containing undissolved ferric oxide ($Fe_2O_3$), neodymium acetate ($Nd(C_2H_3O_2)_3$), and ferric acetate ($Fe_3(CH_3COO)_6(CH_3COO)_3$) which has a solubility higher than that of neodymium acetate ($Nd(C_2H_3O_2)_3$);
   e. discharging said undissolved ferric oxide ($Fe_2O_3$) from said digested solution;
   f. evaporating said digested solution to produce neodymium acetate ($Nd(C_2H_3O_2)_3$) crystals and separating a concentrated liquor which contains ferric acetate;
   g. adding hydrofluoric acid (HF) to said neodymium acetate ($Nd(C_2H_3O_2)_3$) crystals to produce neodymium trifluoride ($NdF_3$), which also regenerates acetic acid ($HC_2H_3O_2$);
   h. separating said neodymium trifluoride ($NdF_3$) from said acetic acid ($HC_2H_3O_2$), and recycling said acetic acid ($HC_2H_3O_2$) back to step "d" so that it can be reused;
   i. drying said neodymium trifluoride ($NdF_3$) by using microwave radiation to produce dry neodymium trifluoride ($NdF_3$); and
   j. repeating steps "a" through "i" until said grinding swarf is completely processed.

2. The invention as defined in claim 1 wherein said neodymium acetate ($Nd(C_2H_3O_2)_3$) contained in said digested solution has a solubility of approximately 260 grams per liter at ambient temperature and contains approximately 42% metal by weight.

3. The invention as defined in claim 1 wherein said dry neodymium trifluoride ($NdF_3$) contains less than approximately 3% moisture.

4. The invention as defined in claim 1 further comprising the steps of:
   k. precipitating a concentrated liquor from step "f" with oxalic acid ($H_2C_2O_4$) to convert a residual neodymium acetate ($Nd(C_2H_3O_2)_3$) into neodymium oxalate ($Nd_2(C_2O_3)_3$);
   l. removing said ferric acetate ($Fe_3(CH_3COO)_6(CH_3COO)_3$); and
   m. repeating steps "g" through "i" to produce dry neodymium trifluoride ($NdF_3$) from said neodymium oxalate ($Nd_2(C_2O_3)_3$), and regenerating and recycling said oxalic acid ($H_2C_2O_4$) back to step "k" so that it can be reused.

5. A process for recovering neodymium (Nd) from a grinding swarf containing neodymium (Nd) and massive iron (Fe), comprising the steps of:
   a. mixing aqueous sodium hydroxide (NaOH) into said grinding swarf which yields a mixture, and grinding the mixture so that said neodymium (Nd) reacts at a fresh surface of the sodium hydroxide (NaOH) to produce neodymium oxide ($Nd_2O_3$) contained in a crude that also contains iron powder (Fe), ferric oxide ($Fe_2O_3$) and aqueous sodium hydroxide (NaOH);

b. applying magnetic restrainers to said crude to remove said iron powder (Fe);

c. filtering said crude and recycling said aqueous sodium hydroxide (NaOH) back to step "a" so that it can be reused;

d. digesting said crude with acetic acid ($HC_2H_3O_2$) to dissolve neodymium oxide ($Nd_2O_3$) but not ferric oxide ($Fe_2O_3$), and to produce a digested solution containing undissolved ferric oxide ($Fe_2O_3$), neodymium acetate ($Nd(C_2H_3O_2)_3$) which has a solubility of approximately 260 grams per liter at ambient temperature and contains approximately 42% metal by weight, and ferric acetate ($Fe_3(CH_3COO)_6(CH_3COO)_3$) which has a solubility higher than that of neodymium acetate ($Nd(C_2H_3O_2)_3$);

e. discharging said undissolved ferric oxide ($Fe_2O_3$) from said digested solution;

f. evaporating said digested solution to produce neodymium acetate ($Nd(C_2H_3O_2)_3$) crystals, and separating a concentrated liquor which contains ferric acetate ($Fe_3(CH_3COO)_6(CH_3COO)_3$) and residual neodymium acetate ($Nd(C_2H_3O_2)_3$);

g. adding hydrofluoric acid (HF) to said neodymium acetate ($Nd(C_2H_3O_2)_3$) crystals to produce neodymium trifluoride ($NdF_3$), which also regenerates acetic acid ($HC_2H_3O_2$);

h. separating said neodymium trifluoride ($NdF_3$) from said acetic acid ($HC_2H_3O_2$), and recycling said acetic acid ($HC_2H_3O_2$) back to step "d" so that it can be reused;

i. drying said neodymium trifluoride ($NdF_3$) by using microwave radiation to produce dry neodymium trifluoride ($NdF_3$) which contains less than approximately 3% moisture;

j. precipitating said concentrated liquor from step "f" with oxalic acid ($H_2C_2O_4$) to convert said residual neodymium acetate ($Nd(C_2H_3O_2)_3$) into neodymium oxalate ($Nd_2(C_2O_3)_3$);

k. removing said ferric acetate ($Fe_3(CH_3COO)_6(CH_3COO)_3$);

l. repeating steps "g" through "i" to produce dry neodymium trifluoride ($NdF_3$) from said neodymium oxalate ($Nd_2(C_2O_3)_3$), and regenerating and recycling said oxalic acid ($H_2C_2O_4$) back to step "j" so that it can be reused; and m. repeating steps "a" through "i" until said grinding swarf is completely processed.

6. A digesting method for a process of recovering neodymium (Nd) from industrial waste by-products of rare earth magnet manufacture, during which process a crude containing neodymium oxide ($Nd_2O_3$) and ferric oxide ($Fe_2O_3$) is generated, the digesting method comprising the step of digesting the crude with acetic acid ($HC_2H_3O_2$) to dissolve neodymium oxide ($Nd_2O_3$) but not ferric oxide ($Fe_2O_3$), and to produce a digested solution containing neodymium acetate ($Nd(C_2H_3O_2)_3$) and undissolved ferric oxide ($Fe_2O_3$).

7. The invention as defined in claim 6 further comprising the steps of:

a. an initial step of mixing aqueous sodium hydroxide (NaOH) into said grinding swarf which yields a mixture, and grinding the mixture to produce said crude containing neodymium oxide ($Nd_2O_3$);

b. evaporating said digested solution to produce neodymium acetate ($Nd(C_2H_3O_2)_3$) crystals and separating a concentrated liquor which contains ferric acetate, and adding hydrofluoric acid (HF) to the neodymium acetate ($Nd(C_2H_3O_2)_3$) crystals to produce neodymium trifluoride ($NdF_3$); and c. drying said neodymium trifluoride ($NdF_3$) by using microwave radiation to produce dry neodymium trifluoride ($NdF_3$).

8. A process for recovering neodymium (Nd) from a grinding swarf containing neodymium (Nd) and massive iron (Fe), comprising the steps of:

a. mixing aqueous sodium hydroxide (NaOH) into said grinding swarf which yields a mixture, and grinding the mixture to produce a crude containing neodymium oxide ($Nd_2O_3$);

b. digesting said crude with acetic acid ($HC_3H_3O_2$) to produce a digested solution containing dissolved neodymium acetate ($Nd(C_2H_3O_2)_3$);

c. evaporating said digested solution to produce neodymium acetate ($Nd(C_2H_3O_2)_3$) crystals and separating a concentrated liquor which contains ferric acetate, and adding hydrofluoric acid (HF) to the neodymium acetate ($Nd(C_2H_3O_2)_3$) crystals to produce neodymium trifluoride ($NdF_3$); and d. drying said neodymium trifluoride ($NdF_3$) by using microwave radiation to produce dry neodymium trifluoride ($NdF_3$).

9. The invention as defined in claim 8 further comprising the step of precipitating a concentrated liquor from step "c" with oxalic acid ($H_2C_2O_4$) to convert residual neodymium acetate ($Nd(C_2H_3O_2)_3$) into neodymium oxalate ($Nd_2(C_2O_3)_3$), and treating the neodymium oxalate ($Nd_2(C_2O_3)_3$) with hydrofluoric acid (HF) precipitation to produce neodymium trifluoride ($NdF_3$).

* * * * *